(12) United States Patent
Breton et al.

(10) Patent No.: US 8,853,293 B2
(45) Date of Patent: *Oct. 7, 2014

(54) CURABLE SOLID INK COMPOSITIONS

(75) Inventors: Marcel P. Breton, Mississauga (CA); Michelle N. Chretien, Mississauga (CA); Peter G. Odell, Mississauga (CA); Christopher Wagner, Toronto (CA)

(73) Assignee: Xerox Corporation, Norwalk, CT (US)

( * ) Notice: Subject to any disclaimer, the term of this patent is extended or adjusted under 35 U.S.C. 154(b) by 467 days.
This patent is subject to a terminal disclaimer.

(21) Appl. No.: 12/642,538

(22) Filed: Dec. 18, 2009

(65) Prior Publication Data

US 2011/0152397 A1  Jun. 23, 2011

(51) Int. Cl.
*C08F 2/46* (2006.01)
*C08J 3/28* (2006.01)
*C09D 11/10* (2014.01)
*C09D 11/101* (2014.01)
*C09D 11/34* (2014.01)

(52) U.S. Cl.
CPC ............. *C09D 11/101* (2013.01); *C09D 11/34* (2013.01); *Y10S 522/909* (2013.01)
USPC ................ 522/79; 522/74; 522/75; 522/80; 522/81; 522/83; 522/113; 522/120; 522/121; 522/150; 522/153; 522/178; 522/182; 522/909; 106/31.13; 106/31.6

(58) Field of Classification Search
USPC ............. 522/71, 74, 113, 120, 121, 155, 178, 522/182; 106/31.13, 31.6
See application file for complete search history.

(56) References Cited

U.S. PATENT DOCUMENTS

| | | | |
|---|---|---|---|
| 3,653,932 A | 4/1972 | Berry et al. | |
| 4,167,503 A * | 9/1979 | Cipriani | 524/297 |
| 4,390,369 A | 6/1983 | Merritt et al. | |
| 4,484,948 A | 11/1984 | Merritt et al. | |
| 4,684,956 A | 8/1987 | Ball | |
| 4,851,045 A | 7/1989 | Taniguchi | |
| 4,889,560 A | 12/1989 | Jaeger et al. | |
| 4,889,761 A | 12/1989 | Titterington et al. | |
| 5,006,170 A | 4/1991 | Schwarz et al. | |
| 5,151,120 A | 9/1992 | You et al. | |
| 5,221,335 A | 6/1993 | Williams et al. | |
| 5,372,852 A | 12/1994 | Titterington et al. | |
| 5,496,879 A | 3/1996 | Griebel et al. | |
| 5,621,022 A | 4/1997 | Jaeger et al. | |
| 5,700,313 A * | 12/1997 | Larson, Jr. | 523/161 |
| 5,804,671 A | 9/1998 | Dones et al. | |
| 5,889,076 A | 3/1999 | Dones et al. | |
| 6,239,189 B1 | 5/2001 | Narayan et al. | |
| 6,316,517 B1 | 11/2001 | Dones et al. | |
| 6,467,897 B1 | 10/2002 | Wu et al. | |
| 6,586,492 B1 | 7/2003 | Caiger et al. | |
| 6,896,937 B2 * | 5/2005 | Woudenberg | 427/511 |
| 7,279,506 B2 | 10/2007 | Sisler et al. | |
| 7,279,587 B2 | 10/2007 | Odell et al. | |
| 7,322,688 B2 | 1/2008 | Woundeberg | |
| 7,559,639 B2 | 7/2009 | Belelie et al. | |
| 7,578,587 B2 * | 8/2009 | Belelie et al. | 347/105 |
| 2003/0036587 A1 | 2/2003 | Kozak | |
| 2006/0122354 A1 | 6/2006 | Carlini et al. | |
| 2006/0132570 A1 | 6/2006 | Odell et al. | |
| 2007/0012217 A1 | 1/2007 | Goredema et al. | |
| 2007/0119337 A1 | 5/2007 | Breton et al. | |
| 2007/0119338 A1 | 5/2007 | Breton et al. | |
| 2007/0119339 A1 | 5/2007 | Kovacs et al. | |
| 2007/0119340 A1 | 5/2007 | P. Breton et al. | |
| 2007/0120908 A1 | 5/2007 | Odell et al. | |
| 2007/0120909 A1 | 5/2007 | Belelie et al. | |
| 2007/0120910 A1 | 5/2007 | Odell et al. | |
| 2007/0120919 A1 | 5/2007 | Goredema et al. | |
| 2007/0120921 A1 | 5/2007 | Carlini et al. | |
| 2007/0120922 A1 * | 5/2007 | Belelie et al. | 347/100 |
| 2007/0120923 A1 | 5/2007 | Kovacs et al. | |
| 2007/0120924 A1 | 5/2007 | Odell et al. | |
| 2007/0120925 A1 | 5/2007 | Belelie et al. | |
| 2007/0123601 A1 | 5/2007 | Belelie et al. | |
| 2007/0123606 A1 * | 5/2007 | Toma et al. | 523/160 |
| 2007/0123641 A1 | 5/2007 | Belelie et al. | |
| 2007/0123642 A1 | 5/2007 | Banning et al. | |
| 2007/0123663 A1 | 5/2007 | Toma et al. | |
| 2007/0123722 A1 | 5/2007 | Toma et al. | |
| 2007/0123723 A1 | 5/2007 | Odell et al. | |
| 2007/0123724 A1 | 5/2007 | Belelie et al. | |
| 2008/0000384 A1 | 1/2008 | Belelie et al. | |
| 2009/9946134 | 2/2009 | Belelie et al. | |
| 2009/0234041 A1 | 9/2009 | Belelie et al. | |
| 2009/0258155 A1 | 10/2009 | Odell et al. | |
| 2012/0088707 A1 | 4/2012 | Paul | |

OTHER PUBLICATIONS

Ash, Michael Ash, Irene (2009). Handbook of Preservatives. Synapse Information Resources, Inc. p. 425 (2009) retrieved online on [Mar. 21, 2014]. Retrived from internet<URL: http://app.knovel.com/hotlink/toc/id:kpHP000012/handbook-preservatives>.*
Sartomer Product Bulletin for SR-399 (7/11). retrived from the internet on [Mar. 21, 2014]. Retrieved from <URL:http://americas.sartomer.com/proddetail.asp?plid=1&sgid=5&prid=SR399>.*
Sartomer Product Bulletin for SR-454 (7/11). Retrieved from internet on [Mar. 21, 2014]. Retrieved from <URL:http://americas.sartomer.com/proddetail.asp?plid=1&sgid=4&prid=SR454>.*
Sartomer Product Bulletin from SR-833 (7/11). Retieved from the internet on [Mar. 21, 2014]. Retrieved from <URL:http://americas.sartomer.com/proddetail.asp?plid=1&sgid=4&prid=SR454>.*
Sartomer Product Bulletin from SR-9003 (7/11). Retrived from internet on [Mar, 21, 2014]. Retrieved from internet <URL:http://americas.sartomer.com/proddetail.asp?plid=1&sgid=3&prid=SR9003B>.*
Office Action mailed Mar. 8, 2011 in U.S. Appl. No. 12/642,569, 28 pages.
Final Office Action mailed Aug. 31, 2011, in U.S. Appl. No. 12/642,569, 22 pages.
Advisory Action mailed Dec. 16, 2011 in U.S. Appl. No. 12/642,569, 22 pages.
Canadian Office Action dated May 10, 2012, Canadian Application No. 2,725,030, 4 pages.
Commonly Assigned, co-pending U.S. Patent Application filed Dec. 18, 2009, of Michelle N. Chretien et al., entitled "Curable Solid Overcoat Compositions" 33 pages, U.S. Appl. No. 12/642,569, not yet published.
"Dimer Acids," Kirk-Othmer Encyclopedia of Chemical Technology, vol. 8, 4th Ed. (1992), pp. 223 to 237.

* cited by examiner

*Primary Examiner* — Sanza McClendon

(74) *Attorney, Agent, or Firm* — Marylou J. Lavoie

(57) ABSTRACT

A radiation curable solid ink composition comprising at least one curable wax that is curable by free radical polymerization; at least one monomer, oligomer, or prepolymer; at least one non-curable wax; at least one free-radical photoinitiator or photoinitiating moiety; and a colorant; wherein the components form a curable ink composition that is a solid at a first temperature of from about 20 to about 25° C.; and wherein the components form a liquid composition at a second temperature of greater than about 40° C.

18 Claims, No Drawings

CURABLE SOLID INK COMPOSITIONS

RELATED APPLICATIONS

Commonly assigned U.S. patent application Ser. No. 12/642,569, entitled "Curable Solid Overcoat Compositions", filed concurrently herewith, which is hereby incorporated by reference herein in its entirety, describes curable solid compositions for coating applications.

TECHNICAL FIELD

Described herein are curable inks, and more particularly, radiation curable solid ink compositions comprising solid monomers and reactive wax for direct to substrate imaging applications, particularly their use in ink jet printing.

BACKGROUND

In general, solid inks (also referred to as phase change inks or hot melt inks) are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing.

Phase change inks for color printing typically comprise a phase change ink carrier composition which is combined with a phase change ink compatible colorant. A series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye, a single pigment, a mixture of dyes, a mixture of pigments, or a combination thereof.

Solid inks typically used with ink-jet printers have a wax-based ink vehicle, for example, a crystalline wax-based ink vehicle. Such solid ink-jet inks provide vivid color images. In typical systems, the crystalline-wax inks are jetted onto a transfer member, for example, an aluminum drum, at temperatures of approximately 120 to about 140° C. The wax-based inks are heated to such high temperatures to decrease their viscosity for efficient and proper jetting onto the transfer member. The transfer member is typically at a temperature of about 60° C., so that the wax will cool sufficiently to solidify or crystallize. As the transfer member rolls over the recording medium, for example paper, the image comprised of wax-based ink is pressed into the paper.

However, the use of crystalline waxes places limitations on the printing process used for conventional solid inks, particularly if the inks are used in a direct to paper application. First, the printhead must be kept at a temperature of about 120° C. which can lead to a number of problems. At these high temperatures, dyes that are molecularly dissolved in the ink vehicle are often susceptible to unwanted interactions leading to poor ink performance. For example, the dyes may be susceptible to thermal degradation, dye diffusion from the ink into the paper or other substrate, leading to poor image quality and showthrough, leaching of the dye into other solvents making contact with the image, leading to poor water/solvent-fastness. Further, for direct to paper applications it is desirable to heat the image after printing to achieve dot gain. In addition, for some substrates, the optimum spreading of the ink drops is difficult to achieve. Moreover, when the printhead is cooled and re-warmed, the resulting contraction and expansion of the ink requires a purge cycle to achieve optimum printhead performance. Particularly, the robustness (for example, smear resistance) of current inks can be insufficient for many potential applications.

While currently available ink compositions are suitable for their intended purposes, a need remains for a new type of solid ink that is capable of being printed via the piezoelectric ink jet printing process. There is further a need for ink compositions that can be processed at lower temperatures and with lower energy consumption, have improved robustness, have improved jetting reliability and latitude, and do not require an intermediate transfuse drum and high pressure fixing. In addition, a need remains for a new type of solid ink composition that exhibits desirably low viscosity values at jetting temperatures, generates images with improved look and feel characteristics, generates images with improved hardness and toughness characteristics, and that is suitable for a number of commonly used substrates. There is further a need for a solid ink composition that can ensure, to the extent that toxic or otherwise hazardous compounds are used in such compositions, that migration, evaporation or extraction of such materials from this new type of ink be controlled or ameliorated. When used in certain applications, for example food packaging, and direct to paper printing, it is desirable to reduce the amount of or eliminate altogether extractable species present, for example to meet environmental, health and safety requirements.

SUMMARY

Described is a radiation-curable solid ink composition comprising at least one curable wax that is curable by free radical polymerization; at least one monomer, oligomer, or prepolymer; at least one non-curable wax; at least one free-radical photoinitiator or photoinitiating moiety; and at least one colorant; wherein the components form a curable ink composition that is a solid at a first temperature of from about 20 to about 25° C.; and wherein the components form a liquid composition at a second temperature of greater than about 40° C. Further described is a process which comprises (1) incorporating into an ink jet printing apparatus a curable solid ink composition comprising at least one curable wax that is curable by free radical polymerization; at least one monomer, oligomer, or prepolymer; at least one non-curable wax; at least one free-radical photoinitiator or photoinitiating moiety; and a colorant; wherein the components form a curable ink composition that is a solid at a first temperature of from about 20 to about 25° C.; and wherein the components form a liquid composition at a second temperature of greater than about 40° C.; (2) melting the ink; (3) causing droplets of the melted ink to be ejected in an imagewise pattern directly onto a final recording substrate; and (4) exposing the imagewise pattern on the final recording substrate to ultraviolet radiation.

Also described is a curable solid ink jet ink stick or pellet comprising an ink composition comprising at least one curable wax that is curable by free radical polymerization; at least one monomer, oligomer, or prepolymer; at least one non-curable wax; at least one free-radical photoinitiator or photoinitiating moiety; and a colorant; wherein the final composition is solid at room temperature of about 20 to about 25° C.

DETAILED DESCRIPTION

A radiation curable solid ink composition is described which can meet the challenges of printing direct to substrate while also enhancing smear resistance. In embodiments, the present curable solid inks (CSI) inks retain the advantages of handling, safety, and print quality usually associated with solid phase change inks while providing additional breakthrough performance enabling characteristics such as: jettability at temperatures of less than about 100° C., little shrinkage with temperature change, flexibility in design allowing for quick adaptability to application requirements and market needs, for example, ability to achieve gloss variation, hardness tuning, adhesion tuning, no post fusing/glossing step required for many applications, superior hardness compared to previously available wax based inks, no smear, and recyclability of prints.

In some embodiment, a radiation-curable solid ink composition is provided comprising at least one curable wax that is curable by free radical polymerization; at least one monomer, oligomer, or prepolymer; at least one non-curable wax; at least one free-radical photoinitiator or photoinitiating moiety; and at least one colorant; wherein the components form a curable ink composition that is a solid at a first temperature of from about 20 to about 25° C.; and wherein the components form a liquid composition at a second temperature of greater than about 40° C., in embodiments from greater than about 40 to about 95° C., from or from about 45 to about 80° C., or from about 50 to about 60° C. In other embodiments, the present CSI compositions comprise blends of waxes, resins, monomers, curable waxes and free-radical photoinitiators, all of which are free of liquid components at room temperature and have little or no odor below about 40° C. In further embodiments, a radiation curable solid ink composition herein comprises a curable wax that is curable by free radical polymerization; a monomer or oligomer, a non-curable wax; a free-radical photoinitiator; and a colorant; wherein the curable wax, the monomer or oligomer, the non-curable wax, and the free-radical photoinitiator are solid at room temperature of about 20 to about 25° C.

The components enable jetting at temperatures in the range of about 70 to about 100° C. It was found, unexpectedly, that while the present inks can be formulated with a pre-cure hardness in the range of about 20 to about 50 at room temperature (about 25° C.) (solid ink hardness is typically about 67), the present CSI compositions can be photochemically cured with high efficiency even at room temperature to form images with excellent smear resistance and with a hardness after cure that is greater than currently available solid inks. The combination of properties enables the present CSI compositions to play an enabling role in existing and/or new applications and printing systems.

The curable wax herein can be any suitable curable wax that is curable by free radical polymerization. Examples of suitable curable waxes include those that are functionalized with curable groups. The curable groups may include, but are not limited to, acrylate, methacrylate, alkene, vinyl, and allylic ether. In embodiments, the radiation curable solid ink composition contains at least one curable wax and the at least one curable wax contains an acrylate, methacrylate, alkene, vinyl, or allylic ether functional group. These waxes can be synthesized by the reaction of a wax equipped with a transformable functional group, such as carboxylic acid or hydroxyl.

Suitable examples of hydroxyl-terminated polyethylene waxes that may be functionalized with a curable group include, but are not limited to, mixtures of carbon chains with the structure $CH_3—(CH_2)_n—CH_2OH$, where there is a mixture of chain lengths, n, where the average chain length is in selected embodiments in the range of about 16 to about 50, and linear low molecular weight polyethylene, of similar average chain length. Suitable examples of such waxes include, but are not limited to, UNILIN® 350, UNILIN® 425, UNILIN® 550 and UNILIN® 700 with Mn approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Specific embodiments of Guerbet alcohols include those containing 16 to 36 carbons, many of which are commercially available from Jarchem Industries Inc., Newark, N.J. In embodiments, PRIPOL® 2033 is selected, PRIPOL® 2033 being a C-36 dimer diol mixture including isomers of the formula

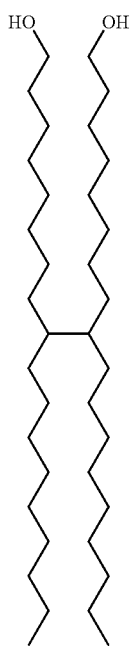 [SMILES: CCCCCCCCCC(CCCCCCCCO)C(CCCCCCCCC)CCCCCCCCO]

as well as other branched isomers which may include unsaturations and cyclic groups, available from Uniqema, New Castle, Del. Further information on C36 dimer diols is disclosed in, for example, "Dimer Acids," Kirk-Othmer Encyclopedia of Chemical Technology, Vol. 8, 4th Ed. (1992), pp. 223 to 237, the disclosure of which is totally incorporated herein by reference. These alcohols can be reacted with carboxylic acids equipped with UV curable moieties to form reactive esters. Examples of these acids include, but are not limited to, acrylic and methacrylic acids, available from Sigma-Aldrich Co. Specific curable monomers include acrylates of UNILIN® 350, UNILIN® 425, UNILIN® 550 and UNILIN® 700.

Suitable examples of carboxylic acid-terminated polyethylene waxes that may be functionalized with a curable group include, but are not limited to, mixtures of carbon chains with the structure $CH_3—(CH_2)_n—COOH$, where there is a mixture of chain lengths, n, where the average chain length is in selected embodiments in the range of about 16 to about 50, and linear low molecular weight polyethylene, of similar average chain length. Suitable examples of such waxes include, but are not limited to, UNICID® 350, UNICID® 425, UNICID® 550 and UNICID® 700 with Mn equal to approximately 390, 475, 565 and 720 g/mol, respectively.

Other suitable waxes have a structure $CH_3-(CH_2)_n-COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or laceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Selected Guerbet acids include those containing 16 to 36 carbons, many of which are commercially available from Jarchem Industries Inc., Newark, N.J. PRIPOL® 1009 (C-36 dimer acid mixture including isomers of the formula

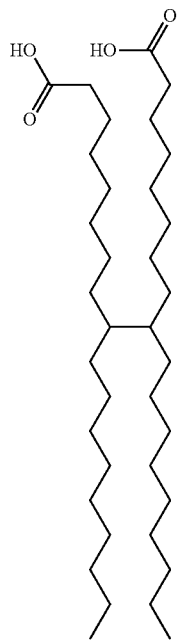 [SMILES: CCCCCCCCCC(CCCCCCCC(=O)O)C(CCCCCCCCC)CCCCCCCC(=O)O]

as well as other branched isomers which may include unsaturations and cyclic groups, available from Uniqema, New Castle, Del., can also be used. These carboxylic acids can be reacted with alcohols equipped with UV curable moieties to form reactive esters. Examples of these alcohols include, but are not limited to, 2-allyloxyethanol from Sigma-Aldrich Co.;

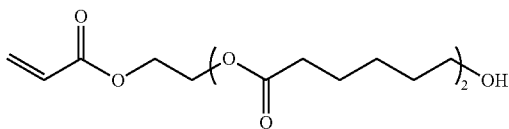

SR495B® from Sartomer Company, Inc.;

TONE® M-101 (R=H, $n_{avg}$=1), TONE® M-100 (R=H, $n_{avg}$=2) and TONE® M-201 (R=Me, $n_{avg}$=1) from The Dow Chemical Company; and

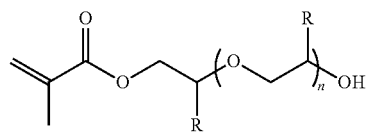

CD572® (R=H, n=10) and SR604® (R=Me, n=4) from Sartomer Company, Inc.

In embodiments, the curable wax is a curable acrylate wax having a melting point of from about 50 to about 60° C.

In specific embodiments, the curable wax is Unilin® 350 acrylate a curable acrylate wax (C22, C23, C24 mixture, melting point about 50 to about 60° C.) available from Baker Hughes, Incorporated, PP-U350a-1®, a curable polypropylene wax available from Clariant, or a combination thereof. Synthesis of Unilin® 350 curable acrylate wax is described in U.S. Pat. No. 7,559,639, which is hereby incorporated by reference herein in its entirety.

The curable wax can be present in any suitable amount. In embodiments, the curable wax can be present in an amount of from about 1 to about 25%, or from about 2 to about 20%, or from about 2.5 to about 15%, by weight based upon the total weight of the curable solid ink composition, although the amounts can be outside of these ranges.

The radiation CSI compositions disclosed herein can comprise any suitable curable monomer, oligomer, or prepolymer that is a solid at room temperature. Examples of suitable materials include radically curable monomer compounds, such as acrylate and methacrylate monomer compounds, which are suitable for use as phase change ink carriers. In embodiments, the at least one monomer, oligomer, or prepolymer is an acrylate monomer, a methacrylate monomer, a multifunctional acrylate monomer, a multifunctional methacrylate monomer, or a mixture or combination thereof.

Specific examples of relatively nonpolar solid acrylate and methacrylate monomers include (but are not limited to) lauryl acrylate, lauryl methacrylate, isodecylacrylate, isodecylmethacrylate, octadecylacrylate, behenyl acrylate, cyclohexane dimethanol diacrylate, and the like, as well as mixtures and combinations thereof.

Specific examples of nonpolar liquid acrylate and methacrylate monomers include (but are not limited to) isobornyl acrylate, isobornyl methacrylate, caprolactone acrylate, 2-phenoxyethyl acrylate, isooctylacrylate, isooctylmethacrylate, butyl acrylate, and the like, as well as mixtures and combinations thereof. In embodiments, the radiation curable solid ink composition herein further comprises at least one monomer, oligomer, or prepolymer that is a nonpolar liquid acrylate or methacrylate monomer selected from the group consisting of isobornyl acrylate, isobornyl methacrylate, caprolactone acrylate, 2-phenoxyethyl acrylate, isooctylacrylate, isooctylmethacrylate, butyl acrylate, or a mixture or combination thereof.

In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl)isocyanurate triacrylate, propoxylated neopentyl glycol diacrylate (available from Sartomer Co. Inc. as SR 9003®), hexanediol diacrylate, tripropylene glycol diacrylate, dipropylene glycol diacrylate, amine modified polyether acrylates (available as PO 83 F®, LR 8869®, and/or LR 8889®) (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494®), and the like, as well as mixtures and combinations thereof.

The monomer, oligomer, prepolymer, reactive diluent, or combination thereof, can be present in any suitable amount. In embodiments, the monomer, oligomer, prepolymer, reactive diluent, or combination thereof is present in an amount of from about 1 to about 80%, or from about 30 to about 70%, or from about 35 to about 60%, by weight based on the total weight of the CSI composition, although the amount can be outside of these ranges.

In embodiments, the at least one monomer, oligomer, or prepolymer is a difunctional cycloaliphatic acrylate monomer, a trifunctional monomer, an acrylate ester, or a mixture or combination thereof. In a specific embodiment, the monomer can be CD-406®, a difunctional cycloaliphatic acrylate monomer (cyclohexane dimethanol diacrylate, melting point about 78° C.) available from Sartomer Company, Inc., SR368®, a trifunctional monomer (tris (2-hydroxy ethyl) isocyanurate triacrylate, melting point about 50 to about 55° C.) available from Sartomer Company, Inc., CD587® an acrylate ester (melting point about 55° C.) Sartomer Company, Inc., or a mixture or combination thereof.

In embodiments, the curable solid ink composition further comprises a curable oligomer. Suitable curable oligomers include, but are not limited to, acrylated polyesters, acrylated polyethers, acrylated epoxies, urethane acrylates, and pentaerythritol tetraacrylate. Specific examples of suitable acrylated oligomers include, but are not limited to, acrylated polyester oligomers, such as CN2255®, CN2256® (Sartomer Co.), and the like, acrylated urethane oligomers, acrylated epoxy oligomers, such as CN2204®, CN110® (Sartomer Co.), and the like; and mixtures and combinations thereof.

In embodiment, the radiation curable solid ink composition comprises at least one monomer, oligomer, or prepolymer having a melting point of from about 45 to about 80° C.

The curable oligomer can be present in any suitable amount, such as from about 0.1 to about 15% or from about 0.5 to about 10%, or from about 1 to about 5% by weight based upon the total weight of the curable solid ink composition.

The non-curable wax herein can be any suitable non-curable wax component that is a solid at room temperature. By non-curable component, it is meant that the component does not react via free radical polymerization or is not radiation curable or not significantly radiation curable. In embodiments, the non-curable wax can be a member of the group consisting of acid waxes esterified with mono or polyvalent alcohols or blends of acid waxes having different degrees of esterification, and combinations thereof.

In one embodiment, the non curable wax is an ester wax. In another embodiment, the non-curable wax is a derivative of montan wax. In a specific embodiment, the non-curable wax can be LicoWax® KFO, an ester wax available from Clariant.

In embodiments, the compositions contain a curable wax in combination with an ester wax wherein the ester wax has an acid value (mg KOH/g) that is greater than from about 15 to less than about 100, or from about 40 to about 95. Acid value can be measured by methods known to one of skill in the art, such as ASTM standard test method ASTM D 974.

In embodiments, the radiation curable solid ink composition contains a non-curable wax comprising an ester wax having a melting point of from about 40 to about 95° C.

The non-curable wax can be present in any suitable amount. In embodiments, the non curable wax can be present in an amount of from about 1 to about 50%, or from about 5 to about 40%, or from about 10 to about 30%, by weight based upon the total weight of the curable solid overcoat composition. In one embodiment, the non curable wax can be present in an amount of from about 20 to about 50% by weight, based upon the total weight of the curable solid ink composition.

In embodiments, the radiation CSI compositions herein are free of (that is, do not contain) any liquid components at room temperature. In other embodiments, the radiation CSI compositions herein comprise at least one curable wax that is curable by free radical polymerization; at least one monomer, oligomer, or prepolymer; at least one non-curable wax; at least one free-radical photoinitiator or photoinitiating moiety, wherein the final composition is solid at room temperature of about 20 to about 25° C.

In embodiments, the radiation curable solid ink composition forms a semi-solid state at an intermediate temperature between a jetting temperature and a substrate temperature and wherein the radiation curable solid ink composition remains in a liquid or semi-solid state for a period of time prior to solidification on the substrate. In other embodiments, the radiation curable solid ink compositions herein are slow to solidify when cooling from the melt temperature, thus forming a semi-solid state at an intermediate temperature between the jetting temperature and the substrate temperature thus enabling controlled spreading or pressure fusing of the compositions upon printing. In certain embodiments, a component rate of crystallization or solidification can be altered in a mixture thus providing conditions where the radiation curable solid ink composition remains in a liquid or semi-solid state for a period of time prior to solidification, thereby providing a solid ink that can be melted so as to enable jetting, having a slow crystallization rate such that the ink remains in a semi-solid state on the paper thereby positively affecting curing performance.

Without wishing to be bound by theory, it is believed that the inclusion of the ester wax selected herein provides the radiation CSI composition with the ability to form an ink that is both hard at room temperature and exhibits good curing.

Further, it was unexpectedly found that blends of monofunctional, difunctional and multifunctional acrylated long chain aliphatics, cycloaliphatic acrylate, and/or reactive isocyanurate derivatives, of molecular weight ranging from about 200 to about 500 g/mole in combination with at least one component comprising a curable wax of molecular weight from about 300 to about 5,000 g/mole, enable achievement of improved smear resistance as observed in "thumb twist" test, reduced offset in document offset tests, and good cure even in the absence of an amine synergist.

Radiation curable as used herein is intended to cover all forms of curing upon exposure to a radiation source, including light and heat sources and including in the presence or absence of initiators. Example radiation curing routes include, but are not limited to, curing using ultraviolet (UV) light, for example having a wavelength of from about 200 to about 400 nanometers, or more rarely visible light, preferably in the presence of photoinitiators and/or sensitizers, curing using e-beam radiation, in embodiments in the absence of photoinitiators, curing using thermal curing, in the presence or absence of high temperature thermal initiators (and which are in embodiments largely inactive at the jetting temperature), and appropriate combinations thereof.

In embodiments, the CSI composition comprises a photoinitiator that initiates polymerization of curable components of the ink, including the curable monomer and the curable wax. The initiator should be solid at room temperature and soluble in the composition at jetting temperature. In specific embodiments, the initiator is an ultraviolet radiation activated photoinitiator.

In embodiments, the initiator is a radical initiator. Examples of suitable radical photoinitiators include, but are not limited to, ketones such as benzyl ketones, monomeric hydroxyl ketones, polymeric hydroxyl ketones, and α-amino ketones; acyl phosphine oxides, metallocenes, benzophenones and benzophenone derivatives, such as 2,4,6-trimethylbenzophenone and 4-methylbenzophenone; and thioxanthenones, such as 2-isopropyl-9H-thioxanthen-9-one. A specific ketone is 1-[4-(2-hydroxyethoxy)-phenyl]-2-hydroxy-2-methyl-1-propane-1-one. In a specific embodiment, the ink contains an α-amino ketone, 1-[4-(2-hydroxyethoxy)-phenyl]-2-hydroxy-2-methyl-1-propane-1-one and 2-isopropyl-9H-thioxanthen-9-one.

In a specific embodiment, the photoinitiator comprises a mixture of 2-isopropylthioxanthone and 2-isopropylthioxanthone, 2-methyl-1[4-(methylthio)phenyl]-2-morpholinopropan-1-one, or a mixture or combination thereof.

In a specific embodiment, the CSI composition comprises a three-component photoinitiator system with no synergist. U.S. Pat. No. 6,896,937 discloses a radiation-curable hot melt ink composition comprising a colorant, a polymerizable monomer and a photoinitiating system comprising 0.5 to 1.5% by weight of an aromatic ketone photoinitiator, 2 to 10% by weight of an amine synergist, 3 to 8% by weight of a second photoinitiator that is different than the aromatic ketone photoinitiator and capable of undergoing alpha cleavage, and 0.5 to 1.5% by weight of a photosensitizer. U.S. Pat. No. 6,896,937 also discloses liquid curable ink compositions and compositions with liquid diluents, which inks are not solids at room temperature. U.S. Pat. No. 7,322,688 discloses a method of inkjet printing curable inks which inks are polymerized by a cationic photoinitiating system.

Known curable ink vehicles have been found to be liquid, gel or very soft solid at room temperature, for example having a hardness of less than about 11. Efforts of the present applicants to improve hardness based on the recommended components disclosed by U.S. Pat. Nos. 6,896,937 and 7,322,688 were unsuccessful. Removing the liquid amine synergist (in contrast to U.S. Pat. No. 6,896,937 which teaches including an amine synergist) increased the initial hardness to about 18 for inks containing an adjuvant, hydroxyl stearic acid, but it also significantly affected the hardness after cure, the hardness being reduced from about 80 to about 85 to about 66, which is less than the hardness value of 67 achieved with current solid inks. This data indicated that it would not be possible to obtain good cure either when an adjuvant was used or when hardness before cure was as high as 18; despite the fact that it has been described that adjuvants can optionally be added to curable phase change inks.

In other embodiments, the initiator is a cationic initiator. Examples of suitable cationic photoinitiators include, but are not limited to, aryldiazonium salts, diaryliodonium salts, triarysulfonium salts, triarylselenonium salts, dialkylphenacylsulfonium salts, triarylsulphoxonium salts and aryloxydiarylsulfonium salts.

The initiator can be present in any effective amount. In embodiments, the initiator is present in an amount of from about 0.5 to about 15% or from about 1 to about 10%, by weight based upon the total weight of the curable solid ink composition.

Any desired or effective colorant can be employed in the inks, including dyes, pigments, mixtures thereof, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

In embodiments, the colorant comprises a dye, a pigment, a curable olefin colorant, or a mixture thereof. Examples of suitable dyes include, but are not limited to, Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF, available from Clariant; Carta Blue 2GL, available from Clariant; solvent dyes, including spirit soluble dyes such as Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF); Neozapon Black X51 [C.I. Solvent Black, C.I. 12195] (BASF); Sudan Blue 670 [C.I. 61554] (BASF); Sudan Yellow 146 [C.I. 12700] (BASF); Sudan Red 462 [C.I. 260501] (BASF); and the like, as well as mixtures thereof.

In embodiments, the colorant is a pigment. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical); PALIOGEN Red 3340 (BASF); SUNFAST® Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC® C Orange 16 (Sun Chemical); HELIOGEN Blue K6902, K6910 (BASF); SUNFAST® Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Carbon Black 5250, Carbon Black 5750 (Columbia Chemical), and the like, as well as mixtures thereof.

The colorant is present in any desired or effective amount to obtain the desired color or hue, such as from about 0.1 to about 15%, or from about 0.2 to about 8%, by weight based upon the total weight of the curable solid ink composition.

The ink may contain optional additives. Optional additives include, but are not limited to, surfactants, light stabilizers, UV absorbers, which absorb incident UV radiation and convert it to heat energy that is ultimately dissipated, antioxidants, optical brighteners, which can improve the appearance of the image and mask yellowing, thixotropic agents, dewetting agents, slip agents, foaming agents, antifoaming agents, flow agents, waxes, oils, plasticizers, binders, electrical conductive agents, fungicides, bactericides, organic and/or inorganic filler particles, leveling agents, e.g., agents that create or reduce different gloss levels, opacifiers, antistatic agents, dispersants, and the like. In particular, the composition may include, as a stabilizer, a radical scavenger, such as Irgastab® UV 10 (Ciba Specialty Chemicals, Inc.). The composition may also include an inhibitor, preferably a hydroquinone, to stabilize the composition by prohibiting or, at least, delaying, polymerization of the oligomer and monomer components during storage, thus increasing the shelf life of the composition. However, additives may negatively affect cure rate, and thus care must be taken when formulating a composition using optional additives.

Optional additives may be present in any suitable amount. In embodiments, the total amount of other additives may be from about 0.1 to about 15% or from about 0.5 to about 10%, by weight based upon the total weight of the curable solid ink composition.

The inks described herein may be applied to a substrate to form an image. In embodiments, the method comprises providing a curable solid ink composition described herein at a first temperature; applying, such as jetting, the radiation curable ink to the substrate in an imagewise fashion to form an image, the substrate being at a second temperature, which is below the first temperature; and exposing the radiation curable ink to radiation to cure the ink. During the curing process, the curable monomer and the curable wax, optionally with other curable components, such as the optional curable oligomer, are polymerized to form a cured image.

In a specific embodiment, the composition is applied by ink jet printing. The inks described herein are preferably jetted at temperatures of about 50° C. to about 110° C. or from about 60° C. to about 100° C. The jetting temperature must be within the range of thermal stability of the composition, to prevent premature polymerization in the print head. At jetting, the inks have a viscosity of from about 5 mPa-s to about 25 mPa-s or about 10 mPa-s to about 12 mPa-s. The inks are thus ideally suited for use in piezoelectric ink jet devices.

However, the substrate to which the inks are applied could be at a temperature at which the ink has a higher viscosity, such as a viscosity of from $10^2$ to $10^7$ mPa-s. For example, the substrate may be maintained at a temperature of about 80° C. or below, more specifically from about 0° C. to 50° C., the temperature at the substrate being less than the jetting temperature. In a specific embodiment, the substrate temperature is at least 10° C. below the first temperature or the substrate temperature is from 10 to 50° C. below the jetting temperature.

By jetting the ink at a temperature at which the ink is a liquid and having the substrate at the temperature at which the ink has a higher viscosity, a phase change can be provided. This phase change may prevent the composition from rapidly soaking into the substrate, avoiding or at least minimizing showthrough. In addition, the ink while on the substrate is exposed to radiation to initiate polymerization of the curable monomer, leading to a robust image.

In specific embodiments, the CSI compositions can be employed in apparatus for direct printing ink jet processes, wherein when droplets of the melted ink are ejected in an imagewise pattern onto a recording substrate and the recording substrate is a final recording substrate, for example, direct to paper applications, although the substrate is not limited to paper. The substrate may be any suitable material such as paper, boxboard, cardboard, fabric, a transparency, plastic, glass, wood etc., although the ink is most specifically used in forming images on paper.

Alternatively, the inks can be employed in indirect (offset) printing ink jet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate.

The inks are suited for jetting onto an intermediate transfer substrate, e.g., an intermediate transfuse drum or belt. In a suitable design, the image may be applied by jetting appropriately colored inks during four to eighteen rotations (incremental movements) of the intermediate transfuse member with respect to the ink jetting head, i.e., there is a small translation of the printhead with respect to the substrate in between each rotation. This approach simplifies the printhead design, and the small movements ensure good droplet registration. Transfuse, i.e., a transfer and fusing or partial fusing step, is desirable in forming the image as transfuse enables a high quality image to be built up on a rapidly rotating transfer member. Transfuse typically involves jetting the ink from the ink jet head onto an intermediate member such as a belt or drum, i.e., the transfuse member. This procedure allows the image to be rapidly built onto the transfuse member for subsequent transfer and fusing to an image receiving substrate.

The intermediate transfer member may take any suitable form, although it is preferably a drum or belt. The member surface may be at room temperature, although in embodiments it is preferable to heat the member such that a surface temperature thereof is maintained within a narrow temperature range so as to control the viscosity characteristics of the inks over a wide range of environmental conditions. This temperature is preferably at or below the second temperature. In this way, the ink is maintained on the surface of the transfer member until transfer to the image receiving substrate.

Following jetting to the intermediate transfer member and optional intermediate partial curing thereon, the ink is thereafter transferred to an image receiving substrate. The substrate may be any suitable material such as paper, boxboard, cardboard, fabric, a transparency, plastic, glass, wood etc., although the ink is most specifically used in forming images on paper. Following transfer to the substrate, the image on the substrate is exposed to radiation having an appropriate wavelength, mainly the wavelength at which the ink initiator absorbs radiation, to initiate the curing reaction of the ink. The radiation exposure need not be long, and may be for, e.g., about 0.05 to about 10 seconds, more preferably from about 0.2 to about 5 seconds. These exposure times are more often expressed as substrate speeds of the ink passing under a UV lamp. For example, the microwave energized, doped mercury bulbs available from UV Fusion (Gaithersburg, Md.) are placed in an elliptical mirror assembly that is 10 cm wide; multiple units may be placed in series. Thus, a belt speed of 0.1 ms$^{-1}$ would require 1 second for a point of an image to pass under a single unit, while a belt speed 4.0 ms$^{-1}$ would require 0.2 s to pass under four bulb assemblies. The radiation to cure the polymerizable components of the ink is preferably provided by a variety of possible techniques, including but not limited to a xenon lamp, laser light, D or H bulb, light emitted diode, etc. The curing light may be filtered or focused, if desired or necessary. The curable components of the ink react to form a cured or crosslinked network of appropriate hardness. Specifically, the curing is substantially complete, i.e., at least 75% of the curable components are cured (polymerized and/or crosslinked), to allow the ink to be substantially hardened, and thereby to be much more scratch resistant, and also to adequately control the amount of showthrough on the substrate.

When an indirect printing process is used, the intermediate transfer member can be of any desired or suitable configuration, such as a drum or roller, a belt or web, a flat surface or platen, or the like preferably, in specific embodiments wherein the intermediate transfer member has good release properties. The intermediate transfer member can be heated by any desired or suitable method, such as by situating heaters in or near the intermediate transfer member, or the like. The intermediate transfer member may also be cooled by situating fans nearby or heat exchange with a cooled fluid. Optionally, a layer of a sacrificial liquid can be applied to the intermediate transfer member prior to ejecting the droplets of melted ink onto the intermediate transfer member, whereby the melted ink droplets are ejected onto the sacrificial liquid layer on the intermediate transfer member. Transfer from the intermediate transfer member to the final recording substrate can be by any desired or suitable method, such as by passing the final recording substrate through a nip formed by the intermediate transfer member and a back member, which can be of any desired or effective configuration, such as a drum or roller, a belt or web, a flat surface or platen, or the like.

The present disclosure is also directed to a printer containing the inks described herein. Specifically, the present disclosure relates to a printer cartridge containing the inks described herein, as well as to a printer containing the printer cartridge.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Curable solid compositions were prepared by combining the components in Table 1 in the amounts listed. Inks were prepared by adding 2% by of a blue olefin dye (24316, available from Kodak) to the curable solid compositions of Table 1, based on the total combined weight of the dye and curable solid composition components. An optimized curable solid ink composition was prepared as set forth in Table 2, wherein the inks were prepared in three batches for a total of 150 grams. The components are as follows:

CD406® is a difunctional cycloaliphatic acrylate monomer (cyclohexane dimethanol diacrylate, melting point about 78° C.) available from Sartomer Company, Inc.;

SR368® is a trifunctional monomer (tris (2-hydroxy ethyl) isocyanurate triacrylate, melting point about 50 to about 55° C.) available from Sartomer Company, Inc.;

CD587® is an acrylate ester (melting point about 55° C.) Sartomer Company, Inc.;

Unilin® 350 acrylate is a curable acrylate wax available from Baker Petrolite, (C22, C23, C24 mixture, melting point about 50 to about 60 C). Unilin 350 can be used as received or synthesized as described in U.S. Pat. No. 7,559,639, which is hereby incorporated by reference herein in its entirety;

CN2255® is a polyester acrylate oligomer, melting point about 53 to about 55° C., available from Sartomer Company, Inc.;

CN2256® is a polyester acrylate oligomer, melting point about 56 to about 58° C., available from Sartomer Company, Inc.;

LicoWax® KFO, drop melting point about 89° C., is an ester wax available from Clariant;

Darocur® ITX is a type II photoinitiator comprising a mixture of 2-isopropylthioxanthone and 2-isopropylthioxanthone, melting point 60 to 67° C., available from Ciba Specialty Chemicals;

Irgacure® 907 is an α-amino-ketone photoinitiator comprising 2-methyl-1[4-(methylthio)phenyl]-2-morpholinopropan-1-one, melting point 70 to 75° C., available from Ciba Specialty Chemicals.

Irgacure® 819 is a bis acyl phosphine photoinitiator comprising bis(2,4,6-trimethyl benzoyl)-phenylphosphineoxide, melting point 127 to 133° C., available from Ciba Specialty Chemicals.

Irgacure® 184 is an α-hydroxy ketone photoinitiator comprising 1-hydroxy-cyclohexyl-phenyl-ketone, melting point 45 to 49° C., available from Ciba Specialty Chemicals.

Pre- and post-cure hardness measurements for Examples 1-9 were obtained using a PTC® Durometer. In comparison to the present examples, the hardness of a commercial sample of a conventional solid ink sold for use in the Xerox Phaser® series of printers is 67.

The cure rate was obtained by measuring the variation of hardness versus ultraviolet light exposure. A Fusion UV Systems, Inc., Lighthammer® equipped with a D-bulb was used to irradiate the ink compositions of Examples 1-9 and hardness was measured after specific exposure times. The hardness versus cure speed (s/ft) plot was used to obtain the initial curing rate for the ink vehicle.

TABLE 1

| Example | 1 | 2 | 3 | 4 | 5 | 6 | 7 | 8 | 9 |
|---|---|---|---|---|---|---|---|---|---|
| Monomer | | | | | | | | | |
| CD406 ® | 2.00 | 2.00 | 2.00 | 2.00 | 2.9 | 2.00 | 2.00 | 2.01 | 2.08 |
| SR368 ® | 1.02 | 1.02 | 1.02 | 1.02 | 1.6 | 1.02 | 1.02 | 1.04 | 1.04 |
| CD587 ® | 3.04 | 3.04 | 3.04 | 3.03 | 2.57 | 3.04 | 3.04 | 3.05 | 2.93 |
| Curable Wax | | | | | | | | | |
| Unilin ® 350 Acrylate-prepared as described in U.S. Pat. No. 7,559,639 | 0.81 | 0.81 | 0.81 | 0.81 | 0.37 | 0.81 | 0.81 | 0.81 | 0.85 |

TABLE 1-continued

| Example | 1 | 2 | 3 | 4 | 5 | 6 | 7 | 8 | 9 |
|---|---|---|---|---|---|---|---|---|---|
| Oligomer | | | | | | | | | |
| CN2255 ® | 0 | 0 | 0 | 0 | 0 | 0.08 | 0 | 0 | 0 |
| CN2256 ® | 0 | 0 | 0 | 0 | 0 | 0 | 0.08 | 0 | 0 |
| Non-curable Wax | | | | | | | | | |
| LicoWax ® KFO | 2.57 | 2.57 | 2.57 | 2.58 | 2 | 2.49 | 2.49 | 2.58 | 2.61 |
| Photoinitiator | | | | | | | | | |
| Darocur ® ITX | 0.05 | 0.05 | 0.05 | 0.05 | 0.05 | 0.05 | 0.05 | 0 | 0 |
| Irgacure ® 907 | 0.51 | 0.51 | 0.51 | 0.51 | 0.51 | 0.51 | 0.51 | 0.51 | 0.1 |
| Irgacure ® 819 | 0 | 0 | 0 | 0 | 0 | 0 | 0 | 0 | 0.16 |
| Irgacure ® 184 | 0 | 0 | 0 | 0 | 0 | 0 | 0 | 0 | 0.23 |
| Total | 10.00 | 10.00 | 10.00 | 10.00 | 10.00 | 10.00 | 10.00 | 10.00 | 10.00 |
| Hardness Before Cure | 37.3 | 36.8 | 32.9 | 37.0 | 28.7 | 36.7 | 35.5 | 35.5 | 31.3 |
| Hardness After Cure | 73.3 | 76.3 | 74.4 | 74.9 | 76.0 | 75.3 | 75.6 | 77.1 | 77.8 |
| Initial Cure Rate (ft/s) | 29.0 | 30.1 | 34.8 | 30.6 | 46.5 | 36.0 | 37.0 | 41.6 | 122.3 |

*Ft/s = feet per second

TABLE 2

| Optimized Curable Solid Ink | | | | | |
|---|---|---|---|---|---|
| | L1a | L1b | L1c | SUM | Weight % |
| Monomer | | | | | |
| CD406 ® | 12.24 | 12.24 | 6.12 | 30.59 | 20.39 |
| SR368 ® | 6.10 | 6.10 | 3.05 | 15.26 | 10.17 |
| CD587 ® | 17.23 | 17.23 | 8.62 | 43.09 | 28.72 |
| Curable Wax | | | | | |
| Unilin ® 350 Acrylate- prepared as described in U.S. Pat. No. 7,559,639 | 5.00 | 5.00 | 2.50 | 12.49 | 8.33 |
| Non-curable Wax | | | | | |
| LicoWax ® KFO | 15.32 | 15.32 | 7.66 | 38.31 | 25.54 |
| Photoinitiator | | | | | |
| Irgacure ® 819 | 0.94 | 0.94 | 0.47 | 2.35 | 1.57 |
| Irgacure ® 184 | 1.35 | 1.35 | 0.68 | 3.39 | 2.26 |
| Irgacure ® 907 | 0.61 | 0.61 | 0.30 | 1.52 | 1.01 |
| Colorant | | | | | |
| Blue Olefin Dye | 1.20 | 1.20 | 0.60 | 3.00 | 2.00 |
| Total | 60.00 | 60.00 | 30.00 | 150.00 | 100.00 |

Curable solid ink compositions are described that provide, in embodiments, a two to three-fold increase in hardness before cure over previously available compositions while achieving a high cure rate and hardness after cure. The viscosity of the ink composition of Example 9 was found to be 8.83 centipoise at 90° C. (jetting temperature).

In addition, since the radiation CSI compositions contain a low concentration of crystalline waxes, it was found that the shrinkage upon cooling from jetting temperature was less than about 5% shrinkage, compared to more than about 10% shrinkage observed for conventional solid inks. Shrinkage was measured by pouring about 6.7 milliliters of molten overcoat into a copper mold of 35 millimeters in diameter and 7 millimeters in height. The ink was left to cool for a minimum of 12 hours and the shrinkage determined from the diameter of the solidified overcoat and of the mold, making the assumption that that shrinkage in y- and x-direction (height) are the same. We believe this will enable vast improvements, or even elimination, of the current maintenance cycle that is used with solid ink jet printers. If we assume that shrinkage is changing linearly with the ratio of amorphous and crystalline wax components, a reduction of 10% in amount of crystalline wax would reduce shrinkage by about 1 to 1.5% or if crystalline wax is present at less than 20%, shrinkage would be less than about 4% instead of greater than 10%.

In embodiment, the radiation CSI compositions herein comprise a low concentration of crystalline wax, wherein the amount of crystalline or semi-crystalline wax is from about 20 to about 50 percent by weight, based on the total weight of the radiation CSI composition.

The ink was found to have a broad crystallization peak before cure. Without wishing to be bound by theory, it is believed that the broad crystallization peak before cure facilitates both direct to paper printing, for example where the substrate is maintained between room temperature (about 20 to about 25° C.) and about 45° C., and excellent cure performance.

In order to evaluate the printing performance, 2 weight %, based upon the total weight of the composition, of a blue olefin dye (24316, available from Kodak) was added to the formulation of Example 9 (viscosity=8.83 centipoise at 90° C.) to be able to visualize the printed image. This dye containing ink was printed on a modified Phaser 8400 fixture using a PIJ printhead. The colored ink was printed at 95° C. on both plain and coated papers (4200®, Xerox Digital Color Xpressions+® and Xerox Digital Color Elite Gloss®, available from Xerox Corporation). The paper was kept at constant temperatures: 35° C., 40° C. and 45° C., respectively, and the resulting prints were cured on a Fusion UV Systems Lighthammer® as described above.

The resulting print was a high resolution print with minimal show-through, and no smear after curing (2×32 feet/minute). Resistance to scratch after cure was enhanced when printed on warmer substrates which allowed for some coating penetration into the substrate and drop coalescence on paper.

It is believed that the robustness of the printed images can be further improved by system optimization including, for example, glossing the image under pressure, providing longer light exposure time and/or increased light intensity.

It is believed that curable solid inks have been formulated for the first time with high hardness at room temperature and fast cure rates. The curable solid inks herein retain the advantages of handling, safety, and print quality usually associated with solid, phase change inks but provide additional breakthrough performance enabling characteristics such as: jettability at temperatures of less than 100° C.; low shrinkage upon solidification from the melt; flexibility in design allowing for quick adaptability to customer requirements and market needs; gloss variation; hardness tuning; adhesion tuning; no post fusing/glossing step required for many applications; superior hardness compared to convention solid wax based inks; no smear; and recyclability of prints.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A radiation curable solid ink composition comprising:
   at least one curable wax that is curable by free radical polymerization, wherein the at least one curable wax is present in an amount of from about 1 to about 25% by weight based upon the total weight of the curable solid ink composition;
   at least one monomer, oligomer, or prepolymer, wherein the at least one monomer, oligomer, or prepolymer is present in an amount of from about 1 to about 80% by weight based on the total weight of the curable solid ink composition;
   wherein the at least one monomer, oligomer, or prepolymer has a melting point of from about 45 to about 80° C.;
   at least one non-curable wax, wherein the non-curable wax is present in an amount of from about 20 to about 50% by weight based upon the total weight of the curable solid ink composition;
   at least one free-radical photoinitiator, wherein the photoinitiator or photoinitiators are present in a total amount of from about 0.5 to about 15% by weight based upon the total weight of the curable solid ink composition; and
   a colorant;
   wherein the components form a curable ink composition that is a solid at a first temperature, wherein the first temperature is from about 20 to about 25° C.;
   wherein the components form a liquid composition at a second temperature, wherein the second temperature is greater than about 40° C.

2. The radiation curable solid ink composition of claim 1, wherein the at least one curable wax contains an acrylate, methacrylate, alkene, vinyl, or allylic ether, functional group.

3. The radiation curable solid ink composition of claim 1, wherein the at least one monomer, oligomer, or prepolymer is an acrylate monomer, a methacrylate monomer, or a mixture or combination thereof.

4. The radiation curable solid ink composition of claim 1, wherein the at least one monomer, oligomer, or prepolymer is cyclohexane dimethanol diacrylate, tris(2-hydroxy ethyl)isocyanurate triacrylate, acrylate ester, or a mixture or combination thereof.

5. The radiation curable solid ink composition of claim 1, where the at least one monomer, oligomer, or prepolymer further comprises a nonpolar liquid acrylate or methacrylate monomer selected from the group consisting of isobornyl acrylate, isobornyl methacrylate, caprolactone acrylate, 2-phenoxyethyl acrylate, isooctylacrylate, isooctylmethacrylate, butyl acrylate, or a mixture or combination thereof.

6. The radiation curable solid ink composition of claim 1, wherein the non-curable wax is an ester wax.

7. The radiation curable solid ink composition of claim 1, wherein the non-curable wax is an ester wax having an acid value (mg KOH/g) of from greater than about 15 to less than about 100.

8. The radiation curable solid ink composition of claim 1, wherein the wherein the non-curable wax is an ester wax having a melting point of from about 40 to about 95° C.

9. The radiation curable solid ink composition of claim 1, wherein the photoinitiator is an ultraviolet radiation activated photoinitiator.

10. The radiation curable solid ink composition of claim 1, wherein the photoinitiator comprises a three-component photoinitiator system with no synergist.

11. The radiation curable solid ink composition of claim 1, wherein the photoinitiator comprises 1-hydroxy-cyclohexylphenyl-ketone, bis(2,4,6-trimethylbenzoyl)-phenylphosphineoxide, and 2-methyl-1[4-(methylthio)phenyl]-2-morpholinopropan-1-one, or a mixture or combination thereof.

12. The radiation curable solid ink composition of claim 1, wherein the composition has a pre-cure hardness in the range of about 20 to about 50 at room temperature.

13. The radiation curable solid ink composition of claim 1, wherein the radiation curable solid ink composition forms a semi-solid state at an intermediate temperature between a jetting temperature and a substrate temperature and wherein the radiation curable solid ink composition remains in a liquid or semi-solid state for a period of time prior to solidification on the substrate.

14. An ink jet printer ink stick or pellet containing a curable solid ink composition comprising at least one curable wax that is curable by free radical polymerization; at least one monomer, oligomer, or prepolymer; at least one non-curable wax; at least one free-radical photoinitiator; and a colorant;
   wherein the at least one curable wax is present in an amount of from about 1 to about 25% by weight based upon the total weight of the curable solid ink composition;
   wherein the at least one monomer, oligomer, or prepolymer is present in an amount of from about 1 to about 80% by weight based on the total weight of the curable solid ink composition;
   wherein the at least one monomer, oligomer, or prepolymer has a melting point of from about 45 to about 80° C.;
   wherein the non-curable wax is present in an amount of from about 20 to about 50% by weight based upon the total weight of the curable solid ink composition; and
   wherein the photoinitiator or photoinitiators are present in a total amount of from about 0.5 to about 15% by weight based upon the total weight of the curable solid ink composition;
   wherein the components form a curable ink composition that is a solid at a first temperature, wherein the first temperature is from about 20 to about 25° C.;
   wherein the components form a liquid composition at a second temperature, wherein the second temperature is greater than about 40° C.

15. A radiation curable solid ink composition comprising:
   at least one curable wax that is curable by free radical polymerization, wherein the at least one curable wax is present in an amount of from about 1 to about 25% by weight based upon the total weight of the curable solid ink composition;

at least one monomer, oligomer, or prepolymer, wherein the at least one monomer, oligomer, or prepolymer is present in an amount of from about 1 to about 80% by weight based on the total weight of the curable solid ink composition;

at least one non-curable wax, wherein the non-curable wax is present in an amount of from about 20 to about 50% by weight based upon the total weight of the curable solid ink composition;

wherein the non-curable wax is an ester wax;

at least one free-radical photoinitiator, wherein the photoinitiator or photoinitiators are present in a total amount of from about 0.5 to about 15% by weight based upon the total weight of the curable solid ink composition; and a colorant;

wherein the components form a curable ink composition that is a solid at a first temperature, wherein the first temperature is from about 20 to about 25° C.;

wherein the components form a liquid composition at a second temperature, wherein the second temperature is greater than about 40° C.

16. The radiation curable solid ink composition of claim 15, wherein the non-curable wax is an ester wax having an acid value (mg KOH/g) of from greater than about 15 to less than about 100.

17. The radiation curable solid ink composition of claim 15, wherein the wherein the non-curable wax is an ester wax having a melting point of from about 40 to about 95° C.

18. The ink jet printer ink stick or pellet of claim 14, wherein the non-curable wax is an ester wax.

* * * * *